US008204516B2

(12) United States Patent
Hsu

(10) Patent No.: US 8,204,516 B2
(45) Date of Patent: Jun. 19, 2012

(54) METHODS FOR SCHEDULING COLLIDED PAGING OCCASIONS OF MULTIPLE WIRELESS NETWORKS AND COMMUNICATION APPARATUSES UTILIZING THE SAME

(75) Inventor: Chia-Chen Hsu, Taipei (TW)

(73) Assignee: MediaTek Inc., Hsin-Chu (TW)

( * ) Notice: Subject to any disclaimer, the term of this patent is extended or adjusted under 35 U.S.C. 154(b) by 658 days.

(21) Appl. No.: 12/241,632

(22) Filed: Sep. 30, 2008

(65) Prior Publication Data

US 2009/0215473 A1 Aug. 27, 2009

Related U.S. Application Data

(60) Provisional application No. 61/031,769, filed on Feb. 27, 2008.

(51) Int. Cl.
*H04W 68/00* (2009.01)
(52) U.S. Cl. ............... 455/458; 455/552.1; 455/445; 370/328; 370/331
(58) Field of Classification Search ................ 455/458, 455/552.1, 448; 370/328, 331
See application file for complete search history.

(56) References Cited

U.S. PATENT DOCUMENTS

| | | | |
|---|---|---|---|
| 5,884,188 A * | 3/1999 | Hayes, Jr. ............ | 455/552.1 |
| 6,282,178 B1 | 8/2001 | Noerpel et al. | |
| 6,307,846 B1 | 10/2001 | Willey | |
| 6,556,820 B1 * | 4/2003 | Le et al. ............... | 455/411 |
| 6,560,439 B1 | 5/2003 | Grayson | |
| 6,999,799 B1 | 2/2006 | Almassy | |
| 7,092,716 B2 * | 8/2006 | Nizri et al. ............ | 455/448 |
| 7,197,323 B2 * | 3/2007 | Terry .................... | 455/458 |
| 7,440,763 B2 * | 10/2008 | Lundsjo et al. ........ | 455/458 |
| 2003/0016174 A1* | 1/2003 | Anderson .............. | 342/378 |
| 2003/0125073 A1* | 7/2003 | Tsai et al. ............. | 455/552 |
| 2005/0124358 A1* | 6/2005 | Willey .................. | 455/458 |
| 2005/0148348 A1* | 7/2005 | Cramby et al. ....... | 455/458 |
| 2005/0186973 A1 | 8/2005 | Gaal et al. | |
| 2009/0176513 A1* | 7/2009 | Bosch et al. .......... | 455/458 |

FOREIGN PATENT DOCUMENTS

CN 1236532 11/1999

OTHER PUBLICATIONS

English language translation of abstract of CN 1236532 (published Nov. 24, 1999).

* cited by examiner

*Primary Examiner* — Jinsong Hu
*Assistant Examiner* — Qun Shen
(74) *Attorney, Agent, or Firm* — Thomas|Kayden

(57) ABSTRACT

A communication apparatus is provided. A first subscriber identity card camps on a first cell. A second subscriber identity card camps on a second cell. A processor obtains information regarding first paging occasions distributed within a predetermined time interval for the first subscriber identity card, obtains information regarding second paging occasions distributed within the predetermined time interval for the second subscriber identity card, detects a forthcoming time slot of the predetermined time interval in which one of the first paging occasions collides with one of the second paging occasions, determines listening to one of the first cell and the second cell in the detected time slot, and notifies of the determination to the radio transceiver module so as to direct the radio transceiver module to listen to the determined cell to receive a corresponding paging message from the determined cell in the detected time slot.

19 Claims, 11 Drawing Sheets

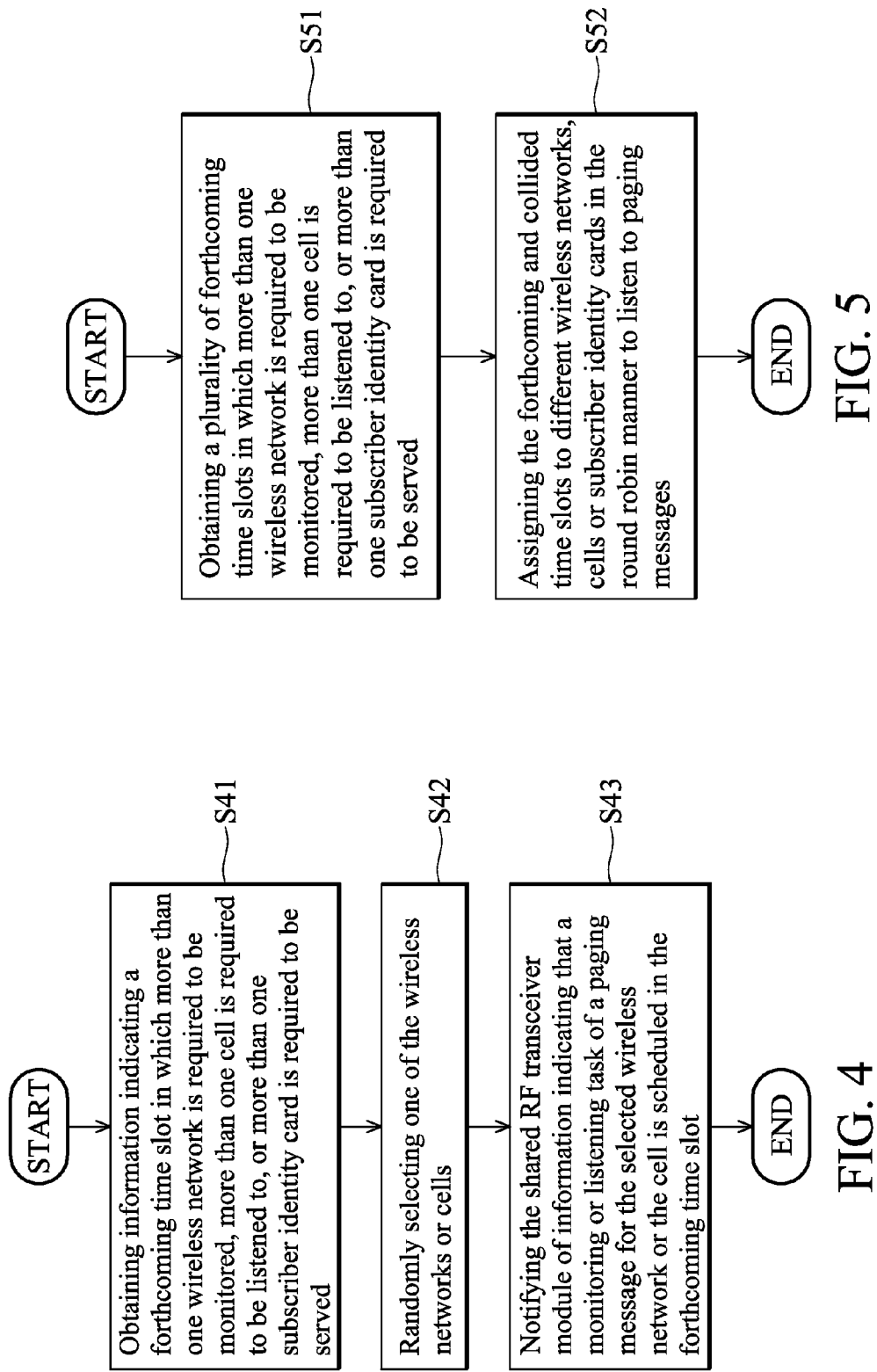

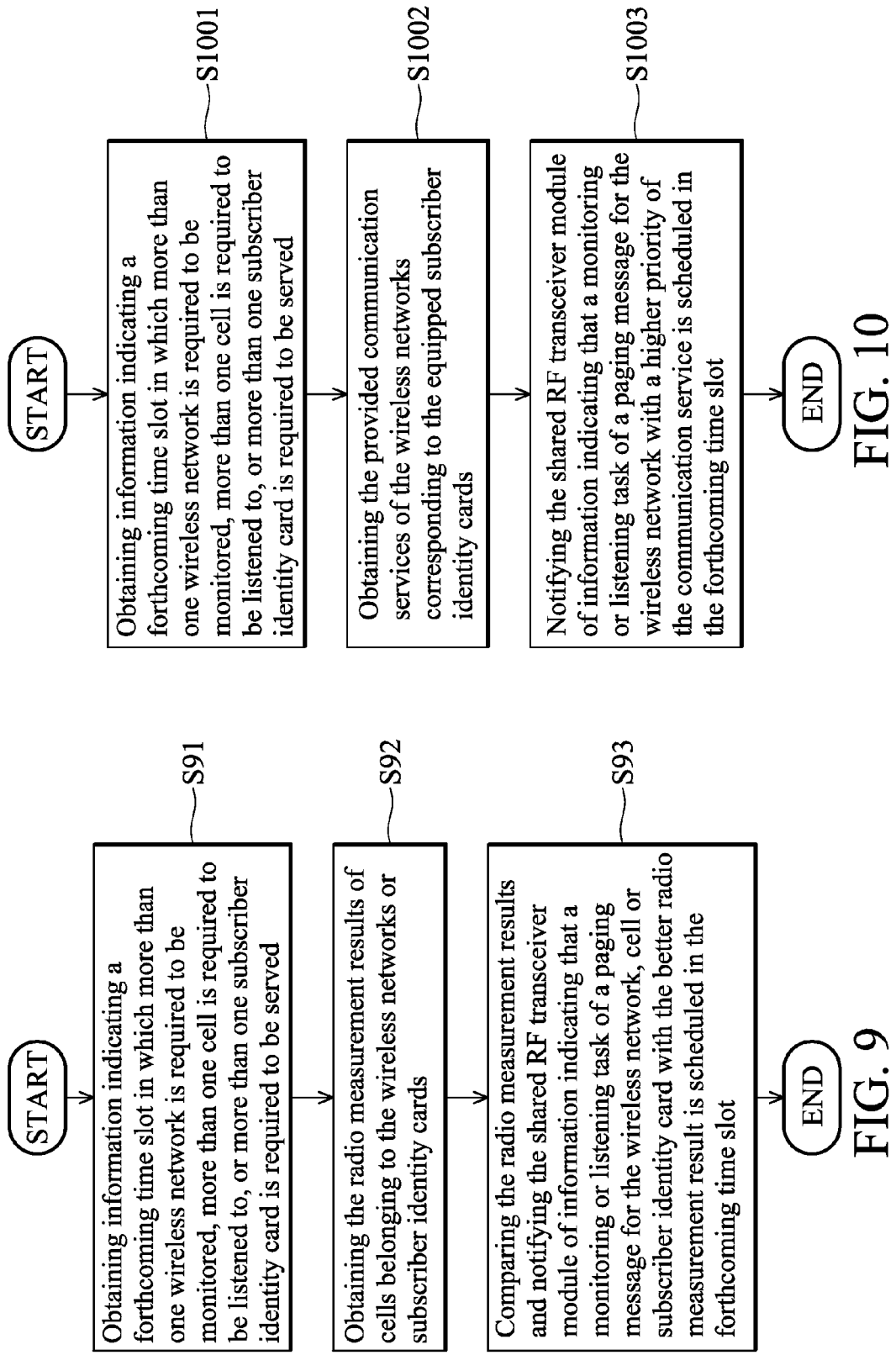

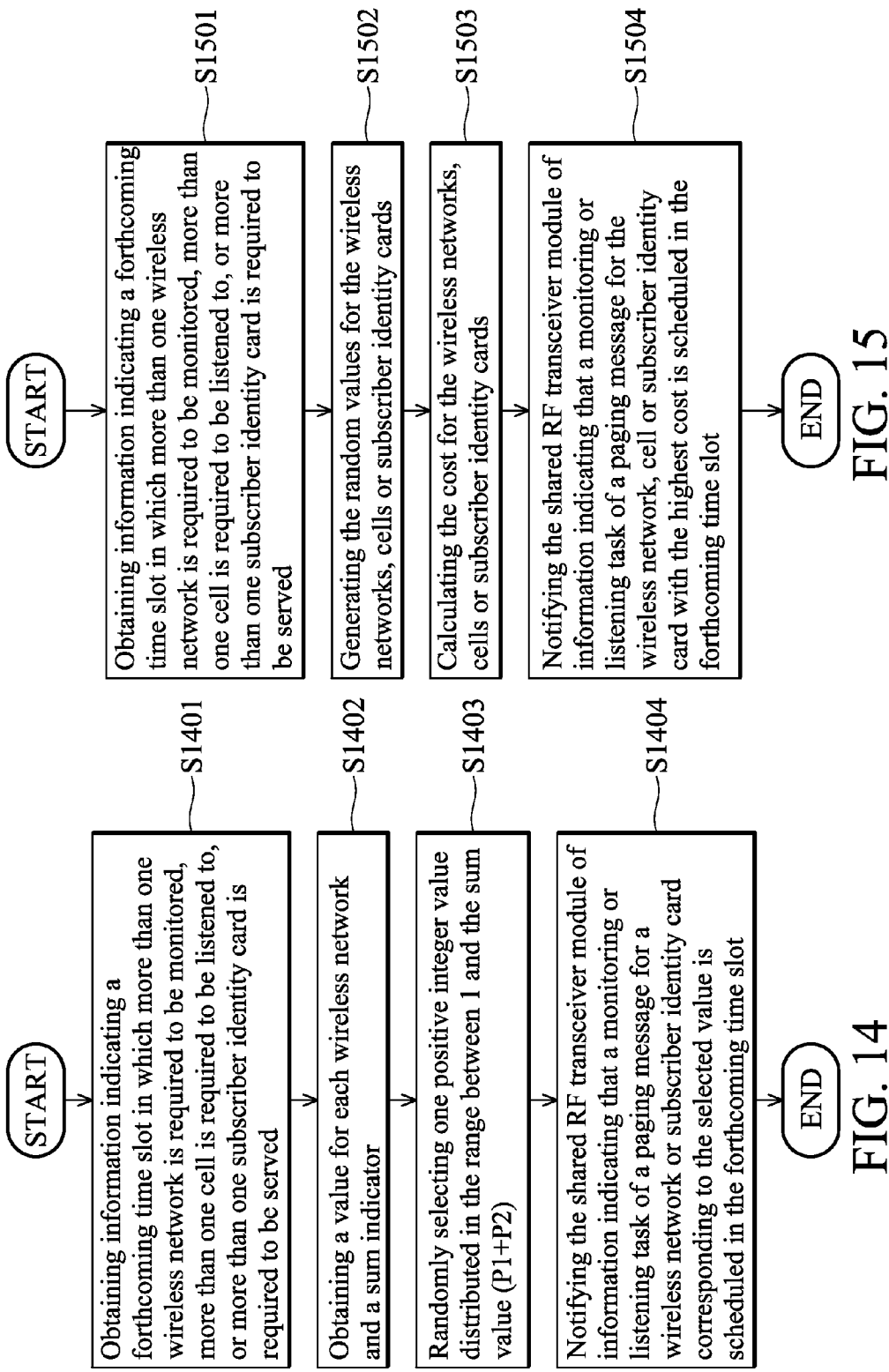

METHODS FOR SCHEDULING COLLIDED PAGING OCCASIONS OF MULTIPLE WIRELESS NETWORKS AND COMMUNICATION APPARATUSES UTILIZING THE SAME

CROSS REFERENCE TO RELATED APPLICATIONS

This application claims the benefit of U.S. Provisional Application No. 61/031,769, filed 2008 Feb. 27 and entitled "Systems and methods for controlling communication channels with different identity modules". The entire contents of which are hereby incorporated by reference.

BACKGROUND OF THE INVENTION

1. Field of the Invention

The invention relates to a method for handling paging occasions in a communication apparatus, and more particularly to a method for handing collided paging occasions of multiple wireless networks in the communication apparatus.

2. Description of the Related Art

The term "wireless", normally refers to an electrical or electronic operation, which is accomplished without the use of a "hard wired" connection. "Wireless communication", is the transfer of information over a distance without the use of electrical conductors or wires. The distances involved may be short (a few meters for television remote controls) or very long (thousands or even millions of kilometers for radio communications). The best known example of wireless communication is the cellular telephone. Cellular telephones use radio waves to enable an operator to make phone calls to another party, from many locations world-wide. They can be used anywhere, as long as there is a cellular telephone site to house equipment that can transmit and receive signals, which are processed to transfer both voice and data to and from the cellular telephones. There are various well-developed and -defined cellular communication technologies. As an example, the Global System for Mobile communications (GSM) is a well-defined and commonly adopted communications system, which uses time division multiple access (TDMA) technology, which is a multiplex access scheme for digital radio, to send voice, data, and signalling data (such as a dialed telephone number) between mobile phones and cell sites. The CDMA2000 is a hybrid mobile communications 2.5G/3G (generation) technology standard, which uses code division multiple access (CDMA) technology. The UMTS (Universal Mobile Telecommunications System) is a 3G mobile communications system, which provides an enhanced range of multimedia services over the 2G GSM system. The Wireless Fidelity (Wi-Fi) is a technology defined by the 802.11b engineering standard and can be used for home networks, mobile phones, video games, to provide a high-frequency wireless local area network.

With the advanced development of wireless communication technologies, it is now possible to provide multiple wireless communication services using different or the same communication technologies in one communication apparatus. In order to provide reliable services, a method for scheduling the page occasions of multiple wireless networks in a communication apparatus is needed.

BRIEF SUMMARY OF THE INVENTION

Communication apparatuses and methods for handling collided paging occasions of multiple wireless networks in a communication apparatus are provided. An embodiment of such a communication apparatus comprises a radio transceiver module, a first subscriber identity card, a second subscriber identity card and a processor. The first subscriber identity card camps on a first cell belonging to a first wireless network. The second subscriber identity card camps on a second cell belonging to a second wireless network. The processor coupled to a radio transceiver module, the first subscriber identity card and the second subscriber identity card obtains information regarding a plurality of first paging occasions distributed within a predetermined time interval for the first subscriber identity card, obtains information regarding a plurality of second paging occasions distributed within the predetermined time interval for the second subscriber identity card, detects a forthcoming time slot of the predetermined time interval in which one of the first paging occasions collides with one of the second paging occasions, determines listening to one of the first cell and the second cell in the detected time slot, and notifies of the determination to the radio transceiver module so as to direct the radio transceiver module to listen to the determined cell to receive a corresponding paging message from the determined cell in the detected time slot.

An embodiment of a method for handling collided paging occasions of multiple wireless networks in a communication apparatus comprises: camping on a first cell via a radio transceiver module with the first subscriber identity card; obtaining information regarding a plurality of first paging occasions distributed within a predetermined time interval for the first subscriber identity card, wherein a plurality of first paging messages are planned to be broadcasted on the first cell in the first paging occasions; camping on a second cell via the radio transceiver module with the second subscriber identity card; obtaining information regarding a plurality of second paging occasions distributed within the predetermined time interval for the second subscriber identity card, wherein a plurality of second paging messages are planned to be broadcasted on the second cell in the second paging occasions; detecting a forthcoming time slot of the predetermined time interval in which one of the first paging occasions collides with one of the second paging occasions; determining listening to one of the first cell and the second cell in the detected time slot; and notifying of the determination to the radio transceiver module so as to direct the radio transceiver module to listen to the determined cell to receive a corresponding paging message from the determined cell in the detected time slot.

A detailed description is given in the following embodiments with reference to the accompanying drawings.

BRIEF DESCRIPTION OF DRAWINGS

The invention can be more fully understood by reading the subsequent detailed description and examples with references made to the accompanying drawings, wherein:

FIG. 4 shows a flow chart of the method for scheduling collided paging occasions of multiple wireless networks according to the first embodiment of the invention;

FIG. 5 shows a flow chart of the method for scheduling collided paging occasions of multiple wireless networks according to the second embodiment of the invention;

FIG. 9 shows a flow chart of the method for scheduling collided paging occasions of multiple wireless networks according to the fourth embodiment of the invention;

FIG. 10 shows a flow chart of the method for scheduling collided paging occasions of multiple wireless networks according to the fifth embodiment of the invention;

FIG. 14 shows a flow chart of the method for scheduling collided paging occasions of multiple wireless networks according to the eighth embodiment of the invention; and FIG. 15 shows a flow chart of the method for scheduling collided paging occasions of multiple wireless networks according to the ninth embodiment of the invention.

DETAILED DESCRIPTION OF THE INVENTION

Figure 1:
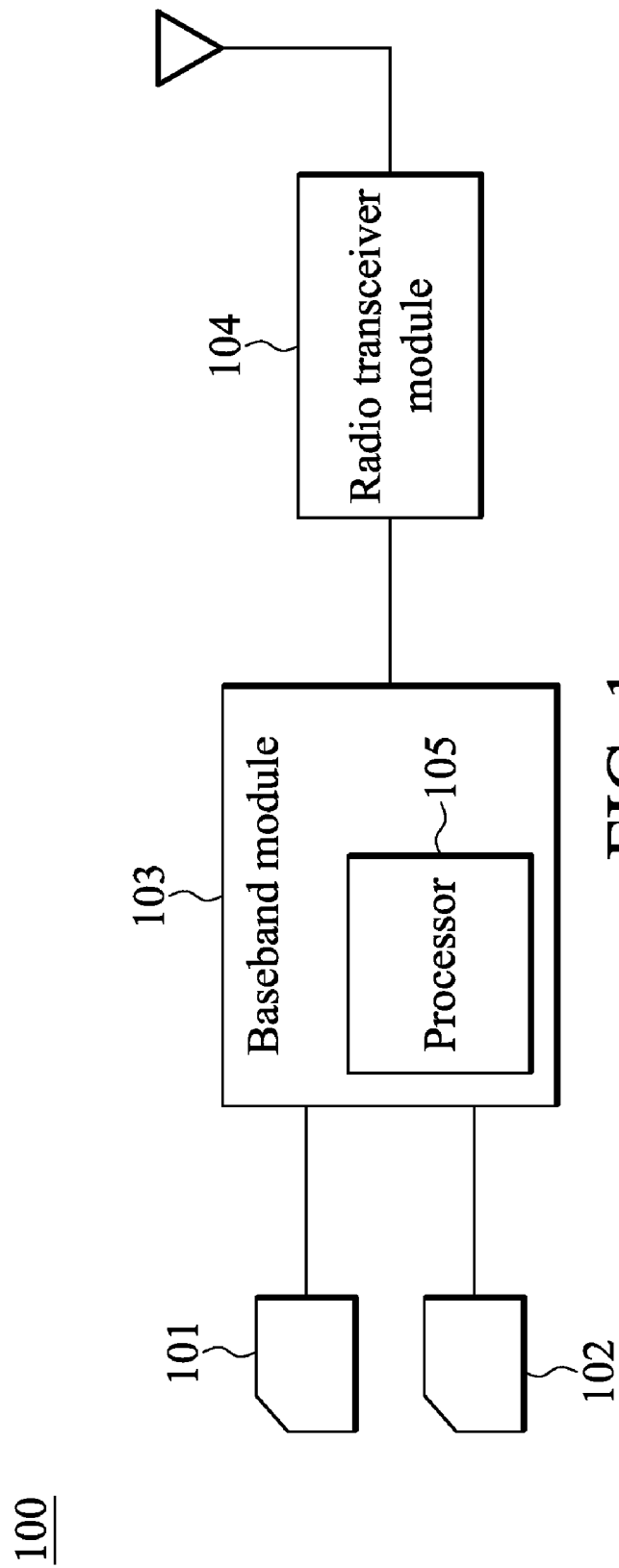
FIG. 1 shows a communication apparatus capable of providing multiple wireless communication services with reduced paging collisions according to an embodiment of the invention.

The following description is of the best-contemplated mode of carrying out the invention. This description is made for the purpose of illustrating the general principles of the invention and should not be taken in a limiting sense. The scope of the invention is best determined by reference to the appended claims. FIG. 1 shows a communication apparatus capable of handling collided paging occasions of multiple wireless networks according to an embodiment of the invention. As shown in FIG. 1, the communication apparatus 100 comprises two subscriber identity cards 101 and 102, a baseband module 103, and a radio transceiver module 104, wherein the baseband module 103 is coupled to the subscriber identity cards 101 and 102, and the radio transceiver module 104. According to another embodiment of the invention, the communication apparatus 100 may also be equipped with more than two subscriber identity cards by the analogy and, however, the subscriber identity cards 101 and 102 are illustrated hereinafter for brevity. The radio transceiver module 104 receives wireless radio frequency signals, converts the received signals to baseband signals to be processed by the baseband module 103, or receives baseband signals from the baseband module 103 and converts the received signals to wireless radio frequency signals to be transmitted to a peer device. The radio transceiver module 104 may comprise a plurality of hardware devices to perform radio frequency conversion. As an example, the radio transceiver module 104 may comprises a mixer to multiply the baseband signals with a carrier oscillated in the radio frequency of the wireless communication system, wherein the radio frequency may be, as an example, 900 MHz or 1800 MHz for a global system for mobile communication (GSM) system. The baseband module 103 further converts the baseband signals to a plurality of digital signals, and processes the digital signals, and vice versa. The baseband module 103 may also comprise a plurality of hardware devices to perform baseband signal processing. The baseband signal processing may comprise analog to digital conversion (ADC)/digital to analog conversion (DAC), gain adjustments, modulation/demodulation, encoding/decoding, and so on. The baseband module 103 further comprises a processor 105 for controlling the operation of the subscriber identity cards 101 and 102 respectively plugged into two sockets, and the radio transceiver module 104. The processor 105 reads data from the plugged subscriber identity cards 101 and 102 and writes data to the plugged subscriber identity cards 101 and 102.

Figure 2:
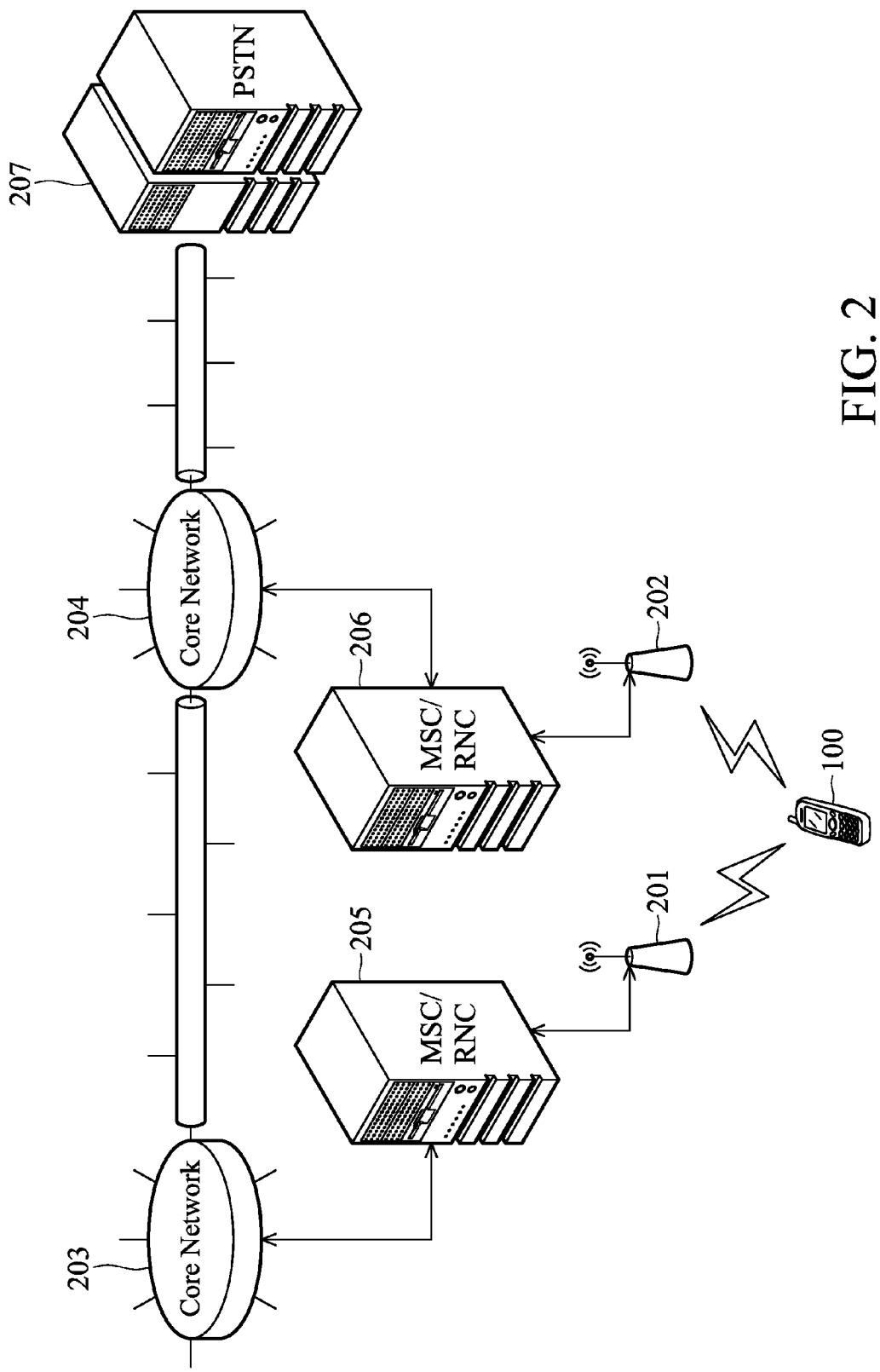
FIG. 2 shows an exemplary network topology according to an embodiment of the invention.

FIG. 2, shows an exemplary network topology according to an embodiment of the invention. Referring to FIG. 2, a communication apparatus 100 equipped with more than one subscriber identity card may simultaneously access more than one core network (CN), such as the CN 203 and 204 network, of the same or different communication technologies such as a Global System for Mobile Communications (GSM), a Wideband Code Division Multiple Access (WCDMA), and a Time Division-Synchronous Code Division Multiple Access (TD-SCDMA) system and the like after camping on the cells managed by the base stations, such as the base stations 201 and 202 of the same or different wireless network(s). The communication apparatus 100 may make a voice or data call to a called party through GSM network with Mobile Switching Center (MSC), WCDMA/TD-SCDMA network with Radio Network Controller (RNC) (such as the MSC/RNC 205 and 206 shown in FIG. 2), Public Switched Telephone Network (PSTN) 207 network or any combinations thereof using either the equipped subscriber identity cards. Moreover, the communication apparatus 100 may receive a phone call with either subscriber identity cards from a calling party.

According to an embodiment of the invention, the subscriber identity card 101 or 102 may relate to one kind of wireless communication system. As an example, the subscriber identity card 101 or 102 may be the subscriber identity module (SIM) card corresponding to the GSM system, or the universal subscriber identity module (USIM) card corresponding to the UMTS system, or the removable user identity module (RUIM) card or the CDMA Subscriber Identity Module (CSIM) card corresponding to the CDMA2000 communication system, or a wireless network card corresponding to IEEE 802.11x wireless local area network (WLAN), or others. An SIM card typically contains user account information, an international mobile subscriber identity (IMSI) and a set of SIM application toolkit (SAT) commands and provides storage space for phone book contacts. The processor 105 of the baseband module 103 may interact with an MCU of the SIM card to fetch data or USAT commands from the plugged SIM card. The communication apparatus 100 is immediately programmed after plugging in the SIM card. The SIM card may be also programmed to display custom menus for personalized services. The communication apparatus 100 may be plugged in an USIM card for UMTS (also called 3G) telephony communication. The USIM card stores user account information, IMSI, authentication information and a set of USIM Application Toolkit (USAT) commands and provides storage space for text messages and phone book contacts. The baseband processor 105 may interact with a MCU of the USIM card to fetch data or USAT commands from the plugged in USIM card. The phone book on the USIM card is more enhanced than that on the SIM card. For authentication purposes, the USIM card may store a long-term preshared secret key K, which is shared with the Authentication Center (AuC) in the network. The USIM MCU may verify a sequence number, that must be within a range, by using a window mechanism to avoid replay attacks, and generates the session keys CK and IK to be used in the confidentiality and integrity algorithms of the KASUMI (also termed A5/3) block cipher in the UMTS system. The communication apparatus 100 is immediately programmed after being plugged into the USIM card. The IMSI is a unique number associated with a global system for mobile communication (GSM) or a universal mobile telecommunications system (UMTS) network user. The IMSI may be sent by the ME to a GSM or UMTS network to acquire other details of the mobile user in the Home Location Register (HLR) or, as locally copied, in the Visitor Location Register (VLR). An IMSI is typically 15 digits long, but can be shorter. The first 3 digits are the Mobile Country Code (MCC), and the following digits, are the Mobile Network Code (MNC), which are either 2 digits (European standard) or 3 digits (North American standard). The remaining digits are the mobile subscriber identification number (MSIN) for a GSM or UMTS network user.

Referring to FIG. 1, when taking the communication apparatus 100 equipped with one or more SIM cards as an example, it is shown that the communication apparatus 100 can be operated in an idle mode and a dedicated mode for each inserted SIM card. During the idle mode, the communication apparatus 100 is either powered off, or searches for or measures the Broadcast Control Channel (BCCH) with better signal quality from a base station provided by a specific network operator, or is synchronized to the BCCH of a specific base station and ready to perform a random access procedure on the Random Access Channel (RACH) for requesting a dedicated channel. During the dedicated mode, the communication apparatus 100 occupies a physical channel and tries to synchronize therewith, and establishes logical channels and appropriately switches between the logical channels.

Specifically, for each inserted SIM card in an idle mode, the communication apparatus 100 continuously listens to the BCCH from a base station and reads the BCCH information and conducts periodic measurements of the signaling strength of the BCCH carriers in order to select a cell to be camped on. During the idle mode, there are no signaling messages being exchanged. The data required for Radio Resource Management (RR) and other signaling procedures is collected and stored, such as the list of neighboring BCCH carriers, thresholds for RR algorithms, Common Control Channel (CCCH) configurations, information regarding the use of RACH and Paging channel (PCH), or others. Such kind of information is broadcast by a base station system on the BCCH, SYSTEM INFORMATION, SI, Types 1-4, and therefore is available to all MSs currently in the cell. The SI comprises a Public-Land-Mobile-Network (PLMN) code uniquely owned by a network operator. The PLMN code, comprising a Mobile Country Code (MCC) and a Mobile Network Code (MNC), indicates which network operator is providing the communication services. In addition, a cell identity (ID), indicating which cell is broadcasting the BCCH, is also contained in the SI. The PLMN code may be acquired and stored in a corresponding SIM card of the electronic device upon receipt of the SI from the BCCH. The BSS further continuously sends on all PCHs of a cell valid Layer 3 message (PAGING REQUEST), wherein the communication apparatus 100 can decode and recognize the cell valid Layer 3 message (PAGING REQUEST) if its address (e.g. its IMSI of a specific SIM card) is paged. The communication apparatus 100, periodically monitors the PCH to avoid paging call loss. Meanwhile, the monitoring moments is referred to as paging occasions.

Taking the communication apparatus 100 equipped with one or more USIM cards (shown in FIG. 1) as an example, the communication apparatus 100 can be operated in an idle mode and a connected mode for each inserted USIM card. For each USIM card in an idle mode, the communication apparatus 100 selects (either automatically or manually) a public land mobile network (PLMN) to contact. The communication apparatus 100 continuously listens to Broadcast Control Channel (BCCH) to acquire SYSTEM INFORMATION (SI) comprising a Public-Land-Mobile-Network (PLMN) code uniquely owned by a network operator. The PLMN code, comprising a Mobile Country Code (MCC) and a Mobile Network Code (MNC), indicates which network operator is providing the communication services. In addition, a cell identity (ID), indicating which cell is broadcasting the BCCH, is also contained in the SI. The PLMN code may be acquired and stored in a corresponding USIM card of the electronic device upon receipt of the SI from the BCCH. The communication apparatus 100 searches for a suitable cell of the chosen PLMN, chooses that cell to provide available services, and tunes into the cell's control channel, also referred to as "camping on a cell". After camping on a cell in an idle mode, the MS can receive system information and cell broadcast messages from a node-B. The communication apparatus 100 stays in the idle mode until the communication apparatus 100 transmits a request to establish a Radio Resource Control (RRC) connection. During the idle mode, the communication apparatus 100 is identified by non-access stratum identities such as IMSI, TMSI and P-TMSI identities.

During the Cell_DCH state of a connected mode, a dedicated physical channel is allocated to the communication apparatus 100, and the communication apparatus 100 is recognized by its serving radio network controller (SRNC) on a cell or active set level. The communication apparatus 100 performs measurements and sends measurement reports according to measurement control information received from radio network controller (RNC). The communication apparatus 100, with certain capabilities, monitors the Forward Access Channel (FACH) for system information messages. During the Cell_FACH state of a connected mode, no dedicated physical channel is allocated for the communication apparatus 100, but Random Access Channel (RACH) and FACH are used instead, for transmitting both signaling messages and small amounts of user plane data. During this state, the communication apparatus 100 also listens to the Broadcast Channel (BCH) to acquire system information. The communication apparatus 100 performs cell reselections, and after a reselection, typically sends a Cell Update message to the RNC, so that the RNC can identify the MS location on a cell level. In the Cell_PCH state of connected mode, the communication apparatus 100 is recognized on a cell level in a Serving Radio Network Controller (SRNC), but the MS can be reached only via the Paging Channel (PCH). The communication apparatus 100 periodically monitors the PCH to avoid paging call loss. Meanwhile, the monitoring moments are referred to as paging occasions.

Figure 3:
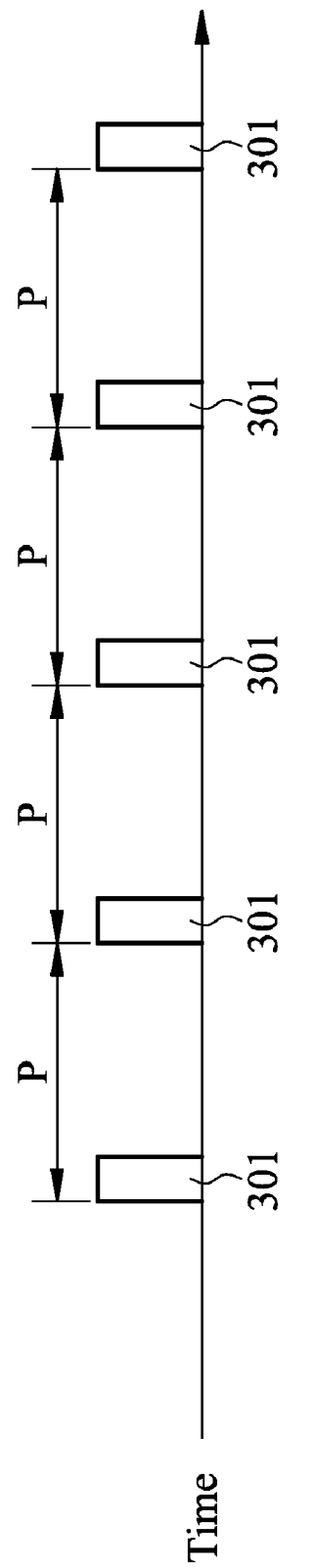
FIG. 3 shows an exemplary distribution of paging occasions along a time axis.

In the communication systems such as the GSM, the UMTS, the General Packet Radio Service (GPRS) or the Time Division-Synchronous Code Division Multiple Access (TD-SCDMA) communication system, the communication apparatus, also known as the mobile station (MS) or the user equipment (UE), may use discontinuous reception (DRX) during the idle mode to reduce power consumption. When DRX is used, the base station (e.g. 201 or 202 of FIG. 2) may transmit the paging messages periodically at the paging occasions and thus, the communication apparatus 100 requires to receive the paging messages carried in the paging channel (PCH) burst at the paging occasions. The paging occasion defines the time for the communication apparatus 100 to wake up and receive the PCH burst. FIG. 3, shows an exemplary distribution of paging occasions 301 and the corresponding paging periods P along a time axis. As FIG. 3 shows, during the DRX cycle, the communication apparatus 100 performing power saving may wake up at its own paging occasions 301 to check up on paging messages. After receiving the paging message, the communication apparatus 100 decides whether to sleep again by checking the Page Indicator (PI) in the paging message. If the paging indicator reveals that the communication apparatus 100 is now being paged, the communication apparatus 100 may initiate a process for receiving an incoming call. Otherwise, the communication apparatus 100 may decide to sleep again and will wake up at its next paging occasion.

The DRX cycle length may be negotiated between the communication apparatus 100 and the node-B (operating as a role similar with that of the base station in GSM). Take the UMTS system as an example, after receiving the DRX cycle length coefficient k from the system information carried in a Broadcast Control Channel (BCCH) burst, the DRX cycle length is determined by $$MAX(2^k, PBP) \text{ frames} \qquad \text{Eq. 1,}$$

where k is an integer and PBP is the paging block periodicity.

According to the specifications defined by the 3rd Generation Partnership Project (3GPP), the communication apparatus 100 may be attached to different core network (CN) domains with different CN domain specific DRX cycle lengths. The communication apparatus 100 may store each CN domain specific DRX cycle length for each CN domain and the communication apparatus 100 is attached to and uses the shortest of those DRX cycle lengths. The PS CN specific DRX cycle length coefficient may be updated after the negotiations between the communication apparatus 100 and the PS CN by a Non-Access Stratum (NAS) procedure. If no specific value "k" is negotiated in the NAS procedure, the communication apparatus 100 and the PS CN may use the DRX cycle length given for the PS CN domain in the system information. The DRX cycle lengths to be used for the UMTS terrestrial radio access network (UTRAN) connected mode, is the shortest of the UTRAN DRX cycle length or any of the stored CN domain specific DRX cycle lengths for the CN domains that the communication apparatus 100 is attached to without established signaling connection.

After determining the DRX cycle length, the value of the paging occasion 301 may be determined as follows:

$$\text{Paging Occasion} = \{(IMSI \text{ div } K) \bmod (DRX \text{ cycle length div PBP})\} \times PBP + n \times DRX \text{ cycle length} + \text{Frame Offset} \qquad \text{Eq. 2,}$$

where IMSI is the international mobile subscriber identity recorded in the SIM cards, n=0, 1, 2 and so on, as long as system frame number (SFN) is below its maximum value, and Frame Offset is the paging indicator channel (PICH) frame offset value. In addition, K represents the number of available secondary common control physical channels (SCCPCH) which carry a PCH, n denotes the system frame number, div is an operator returning integer quotient after division, and mod means modulo operator.

In the CDMA2000, the communication apparatus 100 performs certain tasks during the idle mode after registration is done, and constantly turns parts of the hardware devices (e.g. part of 104 of FIG. 1) on and off. The hardware devices are turned on to perform some vital functions and turned off again to save power so that the battery may last longer. This periodic turning on and off of the mobile transceiver is similar to the DRX operation in the GSM, UMTS, GPRS, or TD-SCDMA system, and is called a slotted mode operation in the CDMA2000. The communication apparatus 100 can operate in the slotted mode only during the idle mode. While the communication apparatus 100 is associated with a particular wireless network, for most of the time, it operates in the idle mode. When the communication apparatus 100 operates in the idle mode, it monitors the paging channel (PCH). If there is a procedure that is required to be carried out after a paging message has been received on the PCH, the mobile transceiver enters the system access mode. Paging messages of the PCH and user's actions may both cause the communication apparatus 100 to change from the idle mode to the system access mode. Thus, during the idle mode, the communication apparatus 100 may receive messages, receive an incoming call (mobile station terminated call), initiate a call (mobile station originated call), initiate a registration, initiate a message transmission, or others.

The communication apparatus 100 wakes up periodically and turns on a receiver thereof to check whether the communication apparatus 100 has been paged, which means that it finds out if there is any incoming calls (mobile termination call, MT call) or any incoming messages. In the CDMA 2000 system, the time to wake up occurs in a slot cycle and the base station controls the period of the slot cycle.

When the communication apparatus 100 first registers at a base station (e.g. 201 or 202 of FIG. 2), the base station and communication apparatus 100 determines which PCH is to be used by the mobile transceiver (if there is more than one) and what phase of the slot cycle is to be used by the mobile transceiver. Thereafter, the communication apparatus 100 wakes up periodically, wherein it turns a receiver thereof on to check if there is an incoming call or if there is any traffic from the cell that the communication apparatus 100 must respond to. If there is nothing, the communication apparatus 100 shuts down the receiver and waits until the next slot time.

The slot cycle index "SLOT_CYCLE_INDEX" specifies the amount of time between successive PCH slots to be monitored by the communication apparatus 100 in the idle state, which may also be referred to as paging occasions, which are shown in 301 of FIG. 3. The amount of time between the slots is equal to $1.28 \times 2^i$ seconds, wherein the parameter i represents the slot cycle index "SLOT_CYCLE_INDEX". The MS may specify a preferred slot cycle index, and during registration, inform the base station of the preferred slot cycle index. The base station would next use the informed preferred slot cycle index to determine the slot to use for paging the communication apparatus 100.

According to an embodiment of the invention, the subscriber identity cards 101 and 102, may respectively receive multiple paging parameters (referred to as first paging parameters for subscriber identity cards 101 and second paging parameters for subscriber identity cards 102 hereinafter) from the cells belonging to wireless networks via the radio transceiver module 104, wherein the cells may be covered by base stations or node-Bs (e.g. 201 and 202 shown in FIG. 2) and the paging parameters may be, as previously discussed above, the "k" value for the UMTS, the "SLOT_CYCLE_INDEX" for the CDMA2000, or others. Upon receipt of the paging parameters, the communication apparatus 100 may propose proper paging parameters in an uplink message "ATTACH" or "ROUTING_AREA_UPDATE" via the radio transceiver module 104 to the wireless networks when registering at the corresponding wireless networks to facilitate the wireless networks to transmit the paging messages in the desired paging occasions, and then camp onto the wireless networks. After registering to more than one network such as the GSM, the GPRS, the UMTS, the CDMA2000, the TD-SCDMA and similar systems, the processor 105 may obtain a plurality of first paging occasions and a plurality of second paging occasions distributed within time slots of a predetermined time interval according to the first paging parameter and the second paging parameter, for example, by using Eq. 2, respectively. Thereafter, the processor 105 respectively receive multiple paging messages (referred to as first paging messages hereinafter) from a camped on cell belonging to the wireless network corresponding to the subscriber identity card 101 in the first paging occasions and receive multiple paging messages (referred to as second paging messages hereinafter) from a camped on cell belonging to a wireless network corresponding to the subscriber identity card 102 in the second paging occasions via the radio transceiver module 104, wherein the paging messages are carried in the paging channel to inform the communication apparatus 100 of the possible of transmissions.

Since the radio transceiver module 104 is shared between the subscriber identity cards 101 and 102, the communication apparatus 100 may monitor only one wireless network for a specific time interval. As a result, listening to a paging message for one accessible wireless network during a wake-up time slot (i.e. paging occasion) may hinder listening for another accessible wireless network. Paging collision occurs when more than two paging occasions corresponding to different wireless networks respectively are present in the substantially same wake-up time slot. It is to be noted that the wake-up time slot includes the warm up time of the radio transceiver module and antenna. Thus, according to embodiments of the invention, the processor 105 may determine to direct the shared radio transceiver module 104 to listen to either the first or second cell to obtain a paging message in the collided paging occasion (i.e. collided time slot) according to a plurality of algorithms upon considering one or more factors. It should be noted that the determinations for handling collided paging occasions may be employed before entering the sleep mode to predict all potential paging collisions between wireless networks according to the obtained broadcast messages in advance and choose one cell (corresponding to a particular wireless network) to be listened to for each paging collision, or may also be employed to make a real-time decision once detecting a forthcoming paging collision, thus, mitigating suffering resulting from the paging collisions. Several embodiments of the determination algorithms are provided in the following descriptions.

According to a first embodiment of the determination algorithm of the invention, as two or more cells are camped on for subscriber identity cards (e.g. 101 and 102 of FIG. 1), the processor 105 may randomly determine monitoring to one of the wireless networks or listening to one of the camped on cells in a collided time slot. FIG. 4, shows a flow chart of the method for handling collided paging occasions according to a first embodiment of the invention. First, information indicating a forthcoming time slot in which more than one wireless network is required to be monitored, more than one cell is required to be listened to, or more than one subscriber identity card is required to be served is obtained (Step S41). Those skilled in the art may also adjust step S41 to obtain information indicating that a forthcoming time slot contains collided paging occasions for different wireless networks, cells or subscriber identity cards. Next, one of the wireless networks or cells is randomly selected (Step S42). Finally, information indicating that a monitoring or listening task of a paging message for the selected wireless network or the cell is scheduled in the forthcoming time slot is notified to the shared RF transceiver module (e.g. 104 of FIG. 1) (Step S43). Thereafter, the shared RF transceiver module with a shared antenna will accordingly listen to a relevant cell to obtain a paging message in the forthcoming time slot.

According to a second embodiment of the determination algorithm of the invention, as two or more cells are camped on or associated with via subscriber identity cards (e.g. 101 and 102 of FIG. 1), the processor 105 may alternately select one of the wireless networks, cells, subscriber identity cards to be monitored, listened to, or served in collided time slots according to a Round-Robin algorithm. FIG. 5, shows a flow chart of the method for handling collided paging occasions according to a second embodiment of the invention. First, a plurality of forthcoming time slots in which more than one wireless network is required to be monitored, more than one cell is required to be listened to, or more than one subscriber identity card is required to be served are obtained (Step S51). Those skilled in the art may also adjust step S51 to obtain information indicating that a plurality of forthcoming time slots each contains collided paging occasions for different wireless networks, cells or subscriber identity cards. After that, the forthcoming and collided time slots are assigned to different wireless networks, cells or subscriber identity cards in the round robin manner to listen to paging messages (Step S52). For example, as two subscriber identity cards are equipped with, the forthcoming and collided time slots are assigned to subscriber identity card A, B, A, B and so on to listen to paging messages. Thereafter, the shared RF transceiver module with a shared antenna will accordingly listen to a relevant cell to obtain a paging message in these forthcoming and collided time slots.

Figures 6, 7:
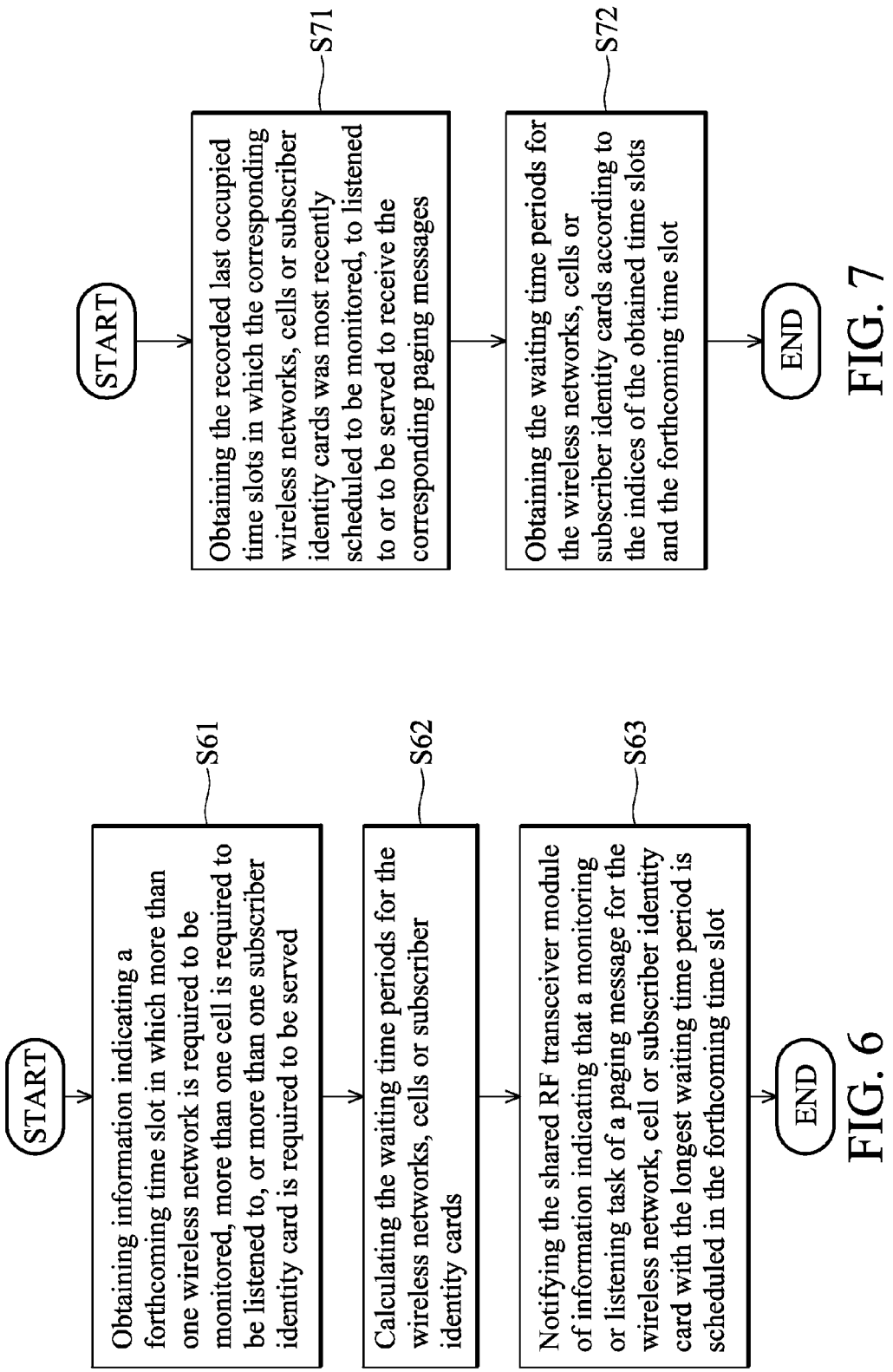
FIG. 6 shows a flow chart of the method for scheduling collided paging occasions of multiple wireless networks according to the third embodiment of the invention.
FIG. 7 shows a flow chart of the method for calculating the waiting time of the wireless network according to an embodiment of the invention.

According to a third embodiment of the determination algorithm of the invention, as two or more cells are camped on or associated with via subscriber identity cards (e.g. 101 and 102 of FIG. 1), the processor 105 may select one of the wireless networks or cells to be monitored or listened to in the collided time slot according to an algorithm for obtaining a minimum paging response delay for each subscriber identity card. Upon waking up to listen to a PCH message from a cell of a wireless network camped on by a subscriber identity card, the processor 105 stores or updates information regarding this occupation for the cell, wireless network or subscriber identity card. When detecting a paging collision between two or more wireless networks or cells in a forthcoming time slot, the processor 105 may choose to listen to a paging message on the least recently monitored wireless network, on the least recently listened cell, or on the cell of the wireless network camped on by the least served subscriber identity card, that is, the wireless network, cell or subscriber identity card with the longest time period from the last occupied time slot (i.e. waiting time period). Furthermore, according to the embodiment of the invention, if more than one wireless network, cell or subscriber identity card has the same wait time period, the wireless network, cell or subscriber identity card with the longest paging period will be determined to be monitored, listened to, or served first. By applying the described rule, the paging response delay for all wireless networks is averaged. FIG. 6, shows a flow chart of the method for handling collided paging occasions according to the third embodiment of the invention. First, information indicating a forthcoming time slot in which more than one wireless network is required to be monitored or more than one cell is required to be listened to, or more than one subscriber identity card is required to be served is obtained (Step S61). Those skilled in the art may also adjust step S61 to obtain information indicating that a forthcoming time slot contains collided paging occasions for different wireless networks, cells or subscriber identity cards. Next, the waiting time periods for the wireless networks, cells or subscriber identity cards are calculated, each indicating a time interval from the last occupied time slot to the forthcoming time slot (Step S62). Finally, information indicating that a monitoring or listening task of a paging message for the wireless network, cell or subscriber identity card with the longest waiting time period is scheduled in the forthcoming time slot is notified to the shared RF transceiver module (Step S63). Thereafter, the shared RF transceiver module with a shared antenna will accordingly listen to a relevant cell to obtain a paging message in the forthcoming time slot.

Figure 8:
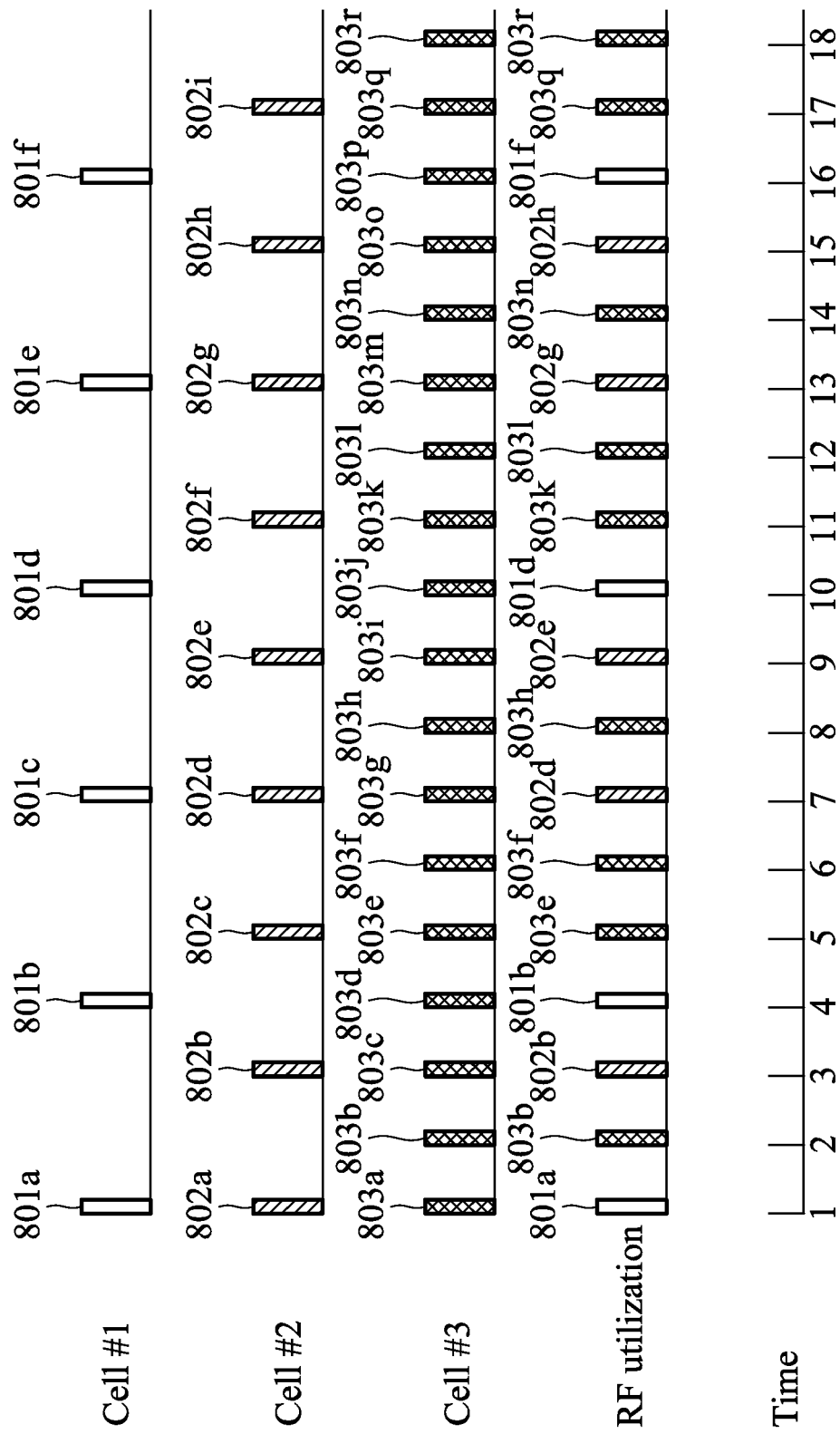
FIG. 8 shows an exemplary case for scheduling collided paging occasions of multiple wireless networks according to the third embodiment of the invention.

FIG. 7 shows a flow chart of a method for calculating the waiting time of the wireless network according to an embodiment of the invention. First, the recorded last occupied time slots in which the corresponding wireless networks, cells or subscriber identity cards was most recently scheduled to be monitored, to listened to or to be served to receive the corresponding paging messages are obtained (Step S71). Then, the waiting time periods for the wireless networks, cells or subscriber identity cards are obtained according to the indices of the obtained time slots and the forthcoming time slot (Step S72). An exemplary case for handling collided paging occasions of multiple wireless networks, cells or subscriber identity cards according to the third embodiment of the invention is provided in the following for better explanation. It is assumed that the communication apparatus 100 camps on three cells (labeled as #1, #2, and #3) corresponding to different subscriber identity cards, each with periodic paging occasions, where any two of the camped on cells may belong to the same or different wireless networks. All periodic paging occasions for the cells are shown in FIG. 8. The first to the third rows show the corresponding paging occasions 801a~801f, 802a~802i and 803a~803r of the first, second and third cells respectively. The fourth row shows the scheduling results to be utilized by the radio transceiver module (also referred to as radio frequency utilization, RF utilization). The fifth row shows the indices of the corresponding time slots. Referring to FIG. 8, following are illustrated details for scheduling collided paging occasions for multiple wireless networks, cells or subscriber identity cards.

At time slot 1, since all camped on cells have the same waiting time periods, the processor 105 determines to listen to the first cell with the longest paging period, as shown in 801a of the fourth row in FIG. 8.

At time slot 2, the processor 105 detects no collisions and determines to listen to the third cell, as shown in the 803b of the fourth row in FIG. 8.

At time slot 3, the processor 105 detects that the paging occasions of the second and third cells have collided. Since the waiting time periods corresponding to the second and third cells are 2 time slots and 1 time slot, respectively, the processor 105 determines to listen to the second cell with the longer waiting time period, as shown in the 802b of the fourth row in FIG. 8. At time slot 4, the processor 105 detects that paging occasions of the first and third cells have collided. Since waiting time periods corresponding to the first and third cells are 3 time slots and 2 time slots, respectively, the processor 105 determines to listen to the first cell, which has a longer waiting time period, as shown in the 801b of the fourth row in FIG. 8.

At time slot 5, the processor 105 detects that paging occasions of the second and third cells have collided. Since the waiting time periods corresponding to the second and third cells are 2 time slots and 3 time slots, respectively, the processor 105 determines to listen to the third cell, which has a longer waiting time period, as shown in the 803e of the fourth row in FIG. 8.

At time slot 6, the processor 105 detects no collisions. Thus, the processor 105 determines to listen to the third cell as shown in the 803f of the fourth row in FIG. 8.

At time slot 7, the processor 105 detects that paging occasions of all cells have collided. Since the waiting time periods corresponding to the first, second and third cells are 3 time slots, 4 time slots and 1 time slot, respectively, the processor 105 determines to listen to the second cell, which has a longer waiting time period, as shown in the 802d of the fourth row in FIG. 8.

At time slot 8, the processor 105 detects no collisions. Thus, the processor 105 determines to listen to the third cell, as shown in the 803h of the fourth row in FIG. 8.

At time slot 9, the processor 105 detects that paging occasions of the second and third cells have collided. Since the waiting time periods corresponding to the second and third cells are 2 time slots and 1 time slot, respectively, the processor 105 determines to listen to the second cell, which has a longer waiting time period, as shown in the 802e of the fourth row in FIG. 8.

At time slot 10, the processor 105 detects that paging occasions of the first and third cells have collided. Since the waiting time periods corresponding to the first and third cells are 6 time slots and 2 time slots, respectively the processor 105 determines to listen to the first cell, which has a longer waiting time period, as shown in the 801d of the fourth row in FIG. 8.

Remaining determinations by the processor 105 can be deduced by the analogy and will not be described hereinafter for brevity.

According to a fourth embodiment of the determination algorithm of the invention, as two or more cells are camped on or associated with via subscriber identity cards (e.g. 101 and 102 of FIG. 1), the processor 105 may determine listening to which one of the camped on cells in a collided time slot according to radio measurement results of the camped on cells. One of the following radio measurement results may be employed in the determining.

1. Probability to successfully decode PCH messages when listening to a camped on cell may be considered as a radio measurement result. The radio measurement results may be accumulated for a predetermined time period and the probability is calculated accordingly. The processor 105 would determine to monitor a wireless network or to listen to a cell with a higher probability than that with the other wireless networks or cells.

2. Probability to lose PCH data on wireless networks during cell reselection may be considered as a radio measurement result. When camped on a cell, the communication apparatus 100 regularly searches for a better cell according to a predefined cell reselection criteria. If a better cell is found, that cell is selected. The processor 105 would determine to monitor a wireless network, which has a lower probability than that with the other wireless networks.

3. Power consumption, when establishing traffic channels on cells or wireless networks, may be considered as a radio measurement result. The processor 105 would determine to monitor a wireless network or listen to a cell with less power consumption than that with the other wireless networks or cells.

4. Received Signal Strength Indication (RSSI) values of listened signals on wireless networks or cells may be considered as a radio measurement result. The processor 105 would determine to monitor a wireless network or to listen to a cell with a stronger RSSI value than that with the other wireless networks or cells.

FIG. 9, shows a flow chart of the method for handling collided paging occasions according to the fourth embodiment of the invention. First, information indicating a forthcoming time slot in which more than one wireless network is required to be monitored, or more than one cell is required to be listened to, or more than one subscriber identity card is required to be served is obtained (Step S91). Those skilled in the art may also adjust step S91 to obtain information indicating that a forthcoming time slot contains collided paging occasions for different wireless networks, cells or subscriber identity cards. Next, the radio measurement results of cells belonging to the wireless networks or subscriber identity cards are obtained (Step S92). Finally, the radio measurement results are compared and information indicating that a monitoring or listening task of a paging message for the wireless network, cell or subscriber identity card with the better radio measurement result is scheduled in the forthcoming time slot is notified to the shared RF transceiver module (Step S93). Thereafter, the shared RF transceiver module with a shared antenna will accordingly listen to a relevant cell to obtain a paging message in the forthcoming time slot.

According to a fifth embodiment of the determination algorithm of the invention, the processor 105 may determine to monitor a wireless network (i.e. to listen to a cell for a wireless network) providing a communication service with a higher priority in the collided time slot, as an example, a voice communication service is given a higher priority than a data communication service. It is to be understood that the provided communication services may relate to equipped subscriber identity cards. FIG. 10, shows a flow chart of the method for handling collided paging occasions according to the fifth embodiment of the invention. First, information indicating a forthcoming time slot in which more than one wireless network is required to be monitored, or more than one cell is required to be listened to, or more than one subscriber identity card is required to be served is obtained (Step S1001). Those skilled in the art may also adjust step S1001 to obtain information indicating that a forthcoming time slot contains collided paging occasions for different wireless networks, cells or subscriber identity cards. Next, the provided communication services of the wireless networks corresponding to the equipped subscriber identity cards (e.g. 101 and 102 of FIG. 1) are obtained (Step S1002). Finally, information indicating that a monitoring or listening task of a paging message for the wireless network with a higher priority of the communication service is scheduled in the forthcoming time slot is notified to the shared RF transceiver module (Step S1003). Thereafter, the shared RF transceiver module with a shared antenna will accordingly listen to a relevant cell to obtain a paging message in the forthcoming time slot.

Figure 11:
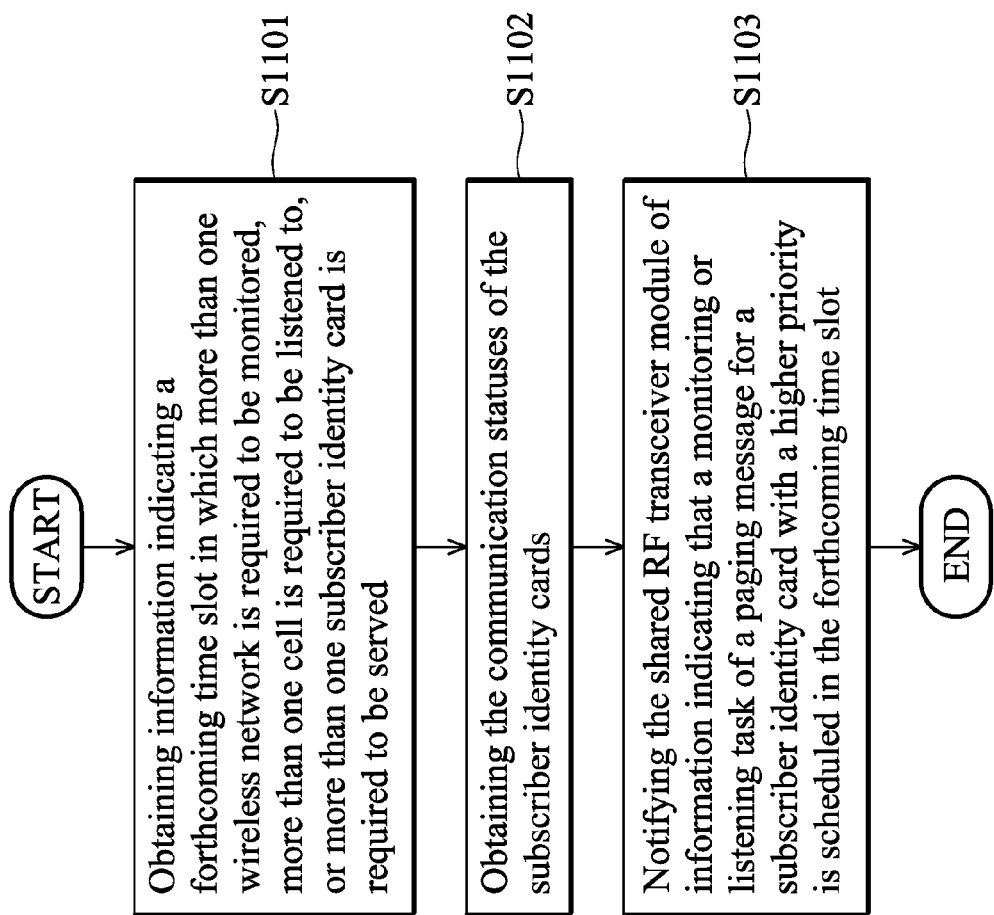
FIG. 11 shows a flow chart of the method for scheduling collided paging occasions of multiple wireless networks according to the sixth embodiment of the invention.

According to a sixth embodiment of the determination algorithm of the invention, as two or more cells are camped on or associated with via subscriber identity cards (e.g. 101 and 102 of FIG. 1), the processor 105 may determine listening to which one of the camped on cells in a collided time slot according to the communication statuses of the corresponding subscriber identity cards. As an example, when the subscriber identity card 101 is roaming in a wireless network other than its home network, the roaming subscriber identity card is given a higher priority. Thus, the processor 105 may schedule a monitoring or listening task of a paging message for the subscriber identity card 101 in the collided time slot. Opposing to the above example, the non-roaming subscriber identity card may be given a higher priority. Under this condition, the processor 105 may schedule a monitoring or listening task of a paging message for the subscriber identity card 102 in the collided time slot. FIG. 11 shows a flow chart of the method for handling collided paging occasions according to the sixth embodiment of the invention. First, information indicating a forthcoming time slot in which more than one wireless network is required to be monitored, or more than one cell is required to be listened to, or more than one subscriber identity card is required to be served is obtained (Step S1101). Those skilled in the art may also adjust step S1011 to obtain information indicating that a forthcoming time slot contains collided paging occasions for different wireless networks, cells or subscriber identity cards. Next, the communication statuses of the subscriber identity cards are obtained (Step S1102). Finally, information indicating that a monitoring or listening task of a paging message for a subscriber identity card with a higher priority is scheduled in the forthcoming time slot is notified to the shared RF transceiver module (Step S1103). Thereafter, the shared RF transceiver module with a shared antenna will accordingly listen to a relevant cell to obtain a paging message in the forthcoming time slot.

According to a seventh embodiment of the determination algorithm of the invention, as two or more cells are camped on or associated with via subscriber identity cards (e.g. 101 and 102 of FIG. 1), the processor 105 may determine listening to which one of the camped on cells in a collided time slot according to guaranteed probabilities for the subscriber identity cards. The guaranteed probability is provided as a predefined threshold so as to ensure that a paging acquisition percentage for a preferred subscriber identity card during monitoring of a corresponding wireless network or listening to a corresponding cell is higher than the predefined threshold, such as 60%, 70%, 80% or higher. The processor 105 may determine one subscriber identity card as a preferred subscriber identity card based on radio measurement results described above.

Upon waking up to listen to a paging message on a cell that the preferred subscriber identity card camps on or another cell, the processor 105 maintains a paging acquisition percentage for the preferred subscriber identity card. The paging acquisition percentage may be calculated by the following formula:

$$\text{Paging Acquisition Percentage} = N_{acq}/N_{total}, \qquad \text{Eq. 3,}$$

where $N_{acq}$ represents a total number of paging messages that have been listened to and/or scheduled to be listened on the cell that the preferred subscriber identity card camps on by the communication apparatus 100, and $N_{total}$ represents a total number of paging messages that have been broadcasted and/or scheduled to be broadcasted on the cell belonging to the preferred subscriber identity card. When detecting a paging collision between two or more cells in a forthcoming time slot, the processor 105 checks the maintained paging acquisition percentage, and accordingly determines whether choosing to listen to a paging message on another cell (that is, another cell that another subscriber identity card camps on) in one collided time slot causes the paging acquisition percentage to become lower than the guaranteed probability. If so, the processor 105 chooses to listen to a paging message on the cell that the preferred subscriber identity card camps on, otherwise, the processor 105 chooses to listen to a paging message on cell that another subscriber identity card camps on.

Figure 12:
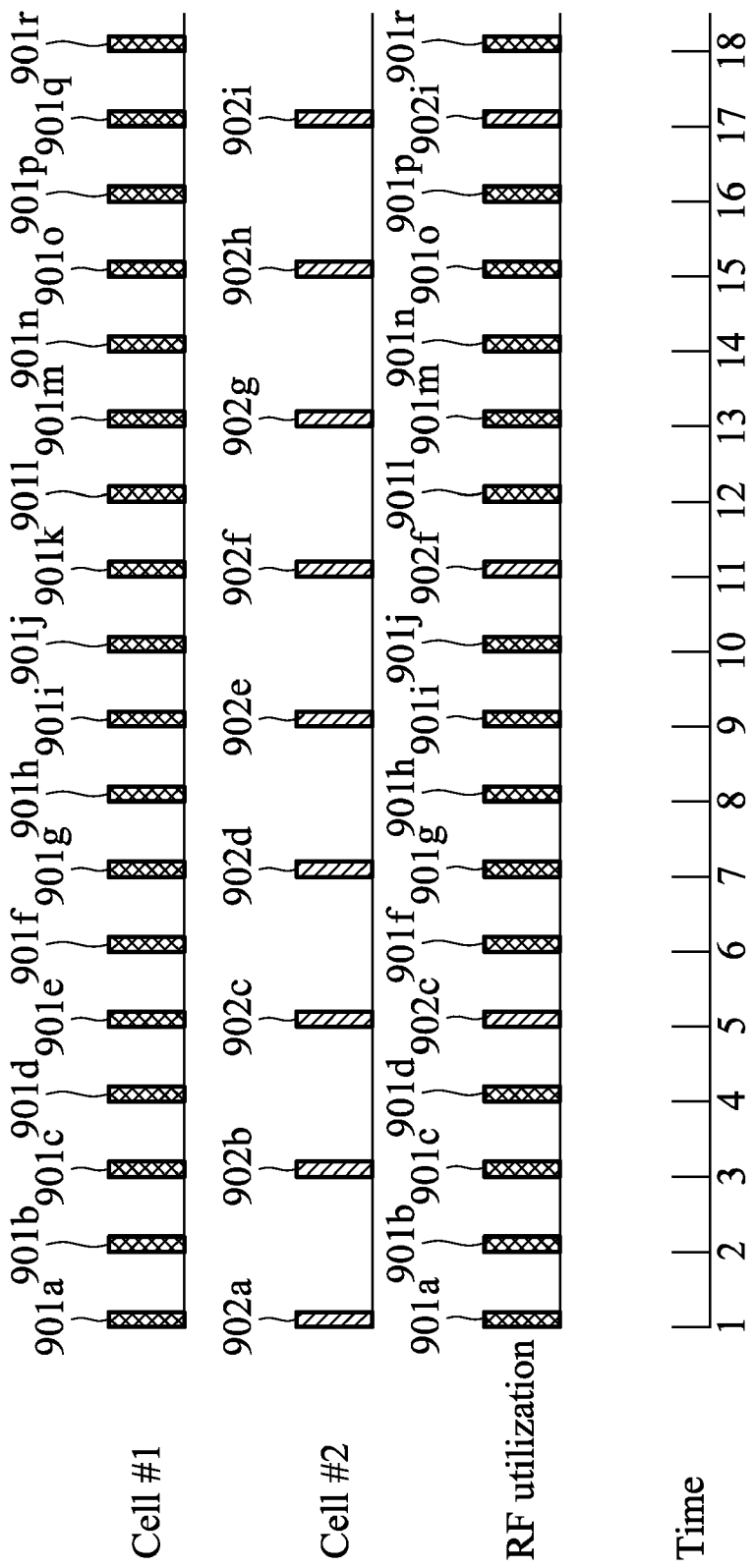
FIG. 12 shows an exemplary case for scheduling collided paging occasions of multiple wireless networks according to the seventh embodiment of the invention.

FIG. 12 shows an exemplary case for handing collided paging occasions according to the seventh embodiment of the invention. It is assumed that the communication apparatus 100 camps on two cells (labeled as #1 and #2), wherein each have periodic paging occasions. The first to the second rows show the corresponding paging occasions 901a~901r and 902a~902i of the first and second cells, respectively. The third row shows the scheduling results to be utilized by the radio transceiver module. The fourth row shows the indices of the time slots. The first cell is camped on by a preferred subscriber identity card and a guaranteed probability is given as 80%. Also, the first cell is chosen to be listened to ensure that the corresponding paging acquisition percentage is higher than 80% in the time slots 1 to 4, 6 to 10, 12 to 16, and 18. Meanwhile, the second cell is listened in the remaining time slots.

Figure 13:
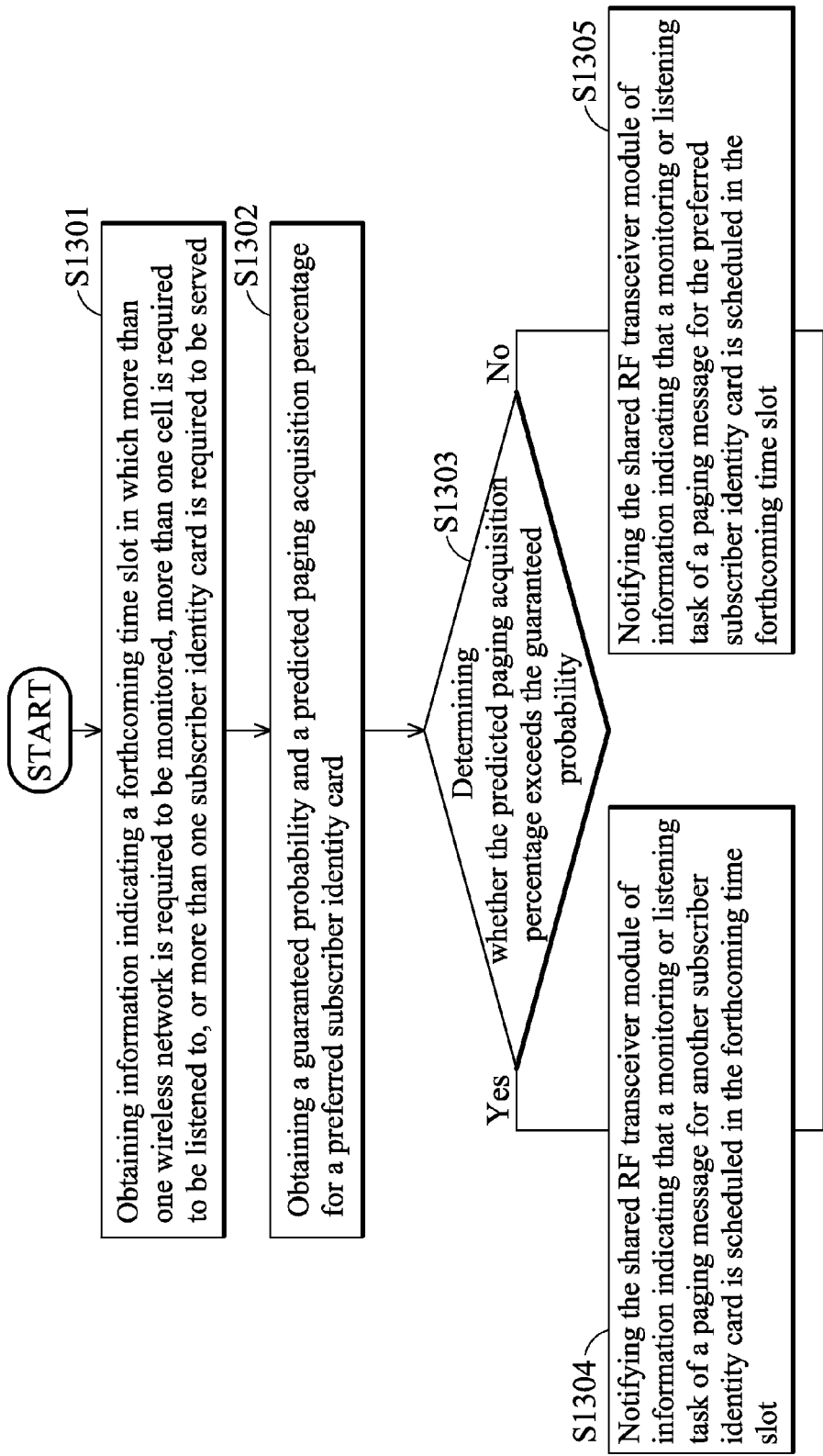
FIG. 13 shows a flow chart of the method for scheduling collided paging occasions of multiple wireless networks according to the seventh embodiment of the invention.

FIG. 13 shows a flow chart of the method for handling collided paging occasions according to the seventh embodiment of the invention. First, information indicating a forthcoming time slot in which more than one wireless network is required to be monitored, or more than one cell is required to be listened to, or more than one subscriber identity card is required to be served is obtained (Step S1301). Those skilled in the art may also adjust step S1301 to obtain information indicating that a forthcoming time slot contains collided paging occasions for different wireless networks, cells or subscriber identity cards. Next, a guaranteed probability and a predicted paging acquisition percentage for a preferred subscriber identity card are obtained (Step S1302). The predicted paging acquisition percentage is calculated under the assumption that this collided time slot is assigned to a task for a subscriber identity card other than the preferred subscriber identity card. The predicted paging acquisition percentage may be obtained by dividing a total number of the paging messages that have been received and/or scheduled to be received by the preferred subscriber identity card during a predetermined time interval into a total number of the paging messages that have been broadcasted and/or scheduled to be broadcasted on the cell that the preferred subscriber identity card camps on, where the predetermined time interval contains this collided time slot. Next, the processor 105 determines whether the predicted paging acquisition percentage exceeds the guaranteed probability (Step 1303). The predicted paging acquisition percentage exceeding or equaling to the guaranteed probability means scheduling a monitoring or listening task for another subscriber identity card in the forthcoming time slot will not harm the preset quality for the preferred subscriber identity card, otherwise, means that will harm the preset quality. If so, information indicating that a monitoring or listening task of a paging message for another subscriber identity card is scheduled in the forthcoming time slot is notified to the shared RF transceiver module (Step S1304). If not, information indicating that a monitoring or listening task of a paging message for the preferred subscriber identity card is scheduled in the forthcoming time slot is notified to the shared RF transceiver module (Step S1305) to keep the paging acquisition percentage to be higher than the guaranteed probability. Thereafter, the shared RF transceiver module with a shared antenna will accordingly listen to a relevant cell to obtain a paging message in the forthcoming time slot.

According to an eighth embodiment of the determination algorithm of the invention, as two or more cells are camped on or associated with via subscriber identity cards (e.g. 101 and 102 of FIG. 1), the processor 105 may determine monitoring to one of the wireless networks or listening to one of the camped on cells in the collided time slot according to predefined values of the wireless networks or the subscriber identity cards. The processor 105 may consider a wireless network or a subscriber identity card with a higher value as the preferred one based on radio measurement results as previously described above, so that the collided time slot may be assigned to the preferred wireless network or subscriber identity card according to the values. FIG. 14, shows a flow chart of the method for handling collided paging occasions according to the eighth embodiment of the invention. Assume that the communication apparatus 100 camps on a first cell corresponding to a first wireless network or subscriber identity card with a higher value than that of a second wireless network or subscriber identity card. First, information indicating a forthcoming time slot in which more than one wireless network is required to be monitored, more than one cell is required to be listened to, or more than one subscriber identity card is required to be served is obtained (Step S1401). Those skilled in the art may also adjust step S1401 to obtain information indicating that a forthcoming time slot contains collided paging occasions for different wireless networks, cells or subscriber identity cards. Next, a value for each wireless network and a sum indicator are obtained (Step S1402). As an example, a value P1 of the first wireless network, a value P2 of the second wireless network and a sum value (P1+P2) are respectively obtained, wherein P1 and P2 are positive integers and P1>P2 representing that the first wireless network or subscriber identity card is a preferred one. Next, one positive integer value distributed in the range between 1 and the sum value (P1+P2) is randomly selected (Step S1403). Finally, information indicating that a monitoring or listening task of a paging message for a wireless network or subscriber identity card corresponding to the selected value is scheduled in the forthcoming time slot is notified to the shared RF transceiver module (Step S1404). As an example, a monitoring or listening task of a paging message for the first wireless network or subscriber identity card is scheduled in the forthcoming time slot when the randomly selected value is within [1, P1] while that for the second wireless network or subscriber identity card is scheduled therein when the randomly selected value is within (P1, P1+P2]. Thereafter, the shared RF transceiver module with a shared antenna will accordingly listen to a relevant cell to obtain a paging message in the forthcoming time slot.

According to a ninth embodiment of the determination algorithm of the invention, as more than two cells are camped on for subscriber identity cards (e.g. 101 and 102 of FIG. 1), the processor 105 may determine monitoring to one of the wireless networks or listening to one of the camped on cells in the collided time slot according to calculated costs for each wireless network, cell or subscriber identity card. Each cost may be calculated using the following formula:

$$F_i = C_{i,1} \times W_i + C_{i,2} \times U_i + C_{i,3} \times R_i + C_{i,4} \times M_i \qquad \text{Eq. 4,}$$

where $F_i$ denotes a calculated cost of the ith wireless network, cell or subscriber identity card, $W_i$ denotes the mentioned waiting time period of the ith wireless network, cell or subscriber identity card, $U_i$ denotes a preference score of the ith wireless network, cell or subscriber identity card defined by a user, $R_i$ denotes a random value generated for the ith wireless network, cell or subscriber identity card, $M_i$ denotes the mentioned measurement results for the ith wireless network, cell or subscriber identity card, and $C_{i,1}$ to $C_{i,4}$ denotes weighting values of $W_i$, $U_i$, $R_i$ and $M_i$.

When detecting a paging collision between two or more wireless networks, cells or subscriber identity cards in an forthcoming time slot, the processor 105 collects data of factors $W_i$, $U_i$, $R_i$ and $M_i$ for each wireless networks, cells or subscriber identity cards, accordingly calculates costs thereof, and chooses to listen to a PCH message on the wireless network, cell or subscriber identity card with the highest cost. FIG. 15, shows a flow chart of the method for handling collided paging occasions according to the ninth embodiment of the invention. First, information indicating a forthcoming time slot in which more than one wireless network is required to be monitored, more than one cell is required to be listened to, or more than one subscriber identity card is required to be served is obtained (Step S1501). Next, the random values for the wireless networks, cells or subscriber identity cards are generated (Step S1502). Next, the cost for the wireless networks, cells or subscriber identity cards are calculated (Step S1503), wherein the values $W_i$, $U_i$, $R_i$ and $M_i$ for each wireless network, cells or subscriber identity cards may be recorded in a database and the processor may access the values when calculating the costs. Finally, information indicating that a monitoring or listening task of a paging message for the wireless network, cell or subscriber identity card with the highest cost is scheduled in the forthcoming time slot is notified to the shared RF transceiver module (Step S1504). Thereafter, the shared RF transceiver module with a shared antenna will accordingly listen to a relevant cell to obtain a paging message in the forthcoming time slot.

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the present invention shall be defined and protected by the following claims and their equivalents.

What is claimed is:

1. A communication apparatus accompanying with a radio transceiver module, a first subscriber identity card camping on a first cell and a second subscriber identity card camping on a second cell for transceiving data via the first cell belonging to a first wireless network and the second cell belonging to a second wireless network, comprising:
    a processor coupled to the radio transceiver module, the first subscriber identity card and the second subscriber identity card, obtaining information regarding a plurality of first paging occasions distributed within a predetermined time interval for the first subscriber identity card, obtaining information regarding a plurality of second paging occasions distributed within the predetermined time interval for the second subscriber identity card;
    a processor detecting a forthcoming time slot of the predetermined time interval in which one of the first paging occasions collides with one of the second paging occasions;
    a processor determining listening to one of the first cell and the second cell in the detected time slot according to at least one of a plurality of decision rules; and
    a processor notifying of the determination to the radio transceiver module so as to direct the radio transceiver module to listen to the determined cell to receive a corresponding paging message from the determined cell in the detected time slot,
    wherein the decision rules comprises: determining a least recently listened cell among the first and second cells, determining a cell having a longer waiting time period to be listened to among the first and second cells, determining a cell having a better signal quality among the first and second cells, determining a cell having a predicted paging acquisition percentage lower than a guaranteed probability among the first and second cells, and randomly determining a cell among the first and second cells.

2. The communication apparatus as claimed in claim 1, wherein another time slot prior to the detected time slot has been assigned to listen to one of the first and second cells, no time slot with a collision between one of the first paging occasions and one of the second paging occasions is present between the assigned time slot and the detected time slot, and further comprises a processor that determines listening to the other one of the first and second cells in the detected time slot.

3. The communication apparatus as claimed in claim 1, further comprising a processor that obtains a first waiting time period between the last time slot being assigned to listen to the first cell and the detected time slot, obtains a second waiting time period between the last time slot being assigned to listen to the second cell and the detected time slot, a processor that compares the first waiting time period and the second waiting time period and a processor that determines listening to the cell with the longer waiting time period in the detected time slot.

4. The communication apparatus as claimed in claim 1, further comprising a processor that obtains a first radio measurement result of the first cell, obtains a second radio measurement result of the second cell, and a processor that determines listening to the cell with the better radio measurement result in the detected time slot.

5. The communication apparatus as claimed in claim 4, wherein the first radio measurement result and the second radio measurement result are obtained by respectively measuring signal quality received from the first cell and the second cell, or by respectively calculating a total number of successfully decoded first paging messages that have been received by the first subscriber identity card and second paging messages that have been received by the second subscriber identity card.

6. The communication apparatus as claimed in claim 1, further comprising a processor that obtains the guaranteed probability for the first wireless network related to the first subscriber identity card, a processor that virtually assigns the detected time slot to the second subscriber identity card in advance for listening to the second cell, a processor that obtains the predicted paging acquisition percentage of the first subscriber identity card by dividing a total number of first paging messages that have been received or scheduled to be received by the first subscriber identity card into a total number of first paging messages that have been broadcasted or scheduled to be broadcasted on the first cell till the detected time slot, a processor that determines listening to the second cell in the detected time slot when the predicted paging acquisition percentage exceeds or equals the guaranteed probability, and a processor that determines listening to the first cell in the detected time slot when the predicted paging acquisition percentage is lower than the guaranteed probability.

7. The communication apparatus as claimed in claim 1, further comprising a processor that obtains a first value for the first subscriber identity card and a second value for the second subscriber identity card, respectively, a processor that obtains a sum value of the first value and the second value, a processor that randomly selects a value between 1 and the sum value, a processor that determines listening to the first cell in the detected time slot when the randomly selected value is between 1 and the first value and a processor that determines listening to the second cell in the detected time slot when the randomly selected value exceeds the first value.

8. The communication apparatus as claimed in claim 1, wherein a first paging parameter is obtained from the system information carried in a Broadcast Control Channel (BCCH) burst on the first cell and a second paging parameter is obtained from the system information carried in a Broadcast Control Channel (BCCH) burst on the second cell, the first paging occasions are distributed in response to the first paging parameter, and the second paging occasions are distributed in response to the second paging parameter.

9. The communication apparatus as claimed in claim 1, wherein one of the first subscriber identity card and the second subscriber identity card is the subscriber identity module (SIM) card corresponding to the global system for mobile communications (GSM), or the universal subscriber identity module (USIM) card corresponding to the universal mobile telecommunications system (UMTS), or the removable user identity module (RUIM) card, or the CDMA subscriber identity module (CSIM) card corresponding to the code division multiple access (CDMA) 2000 communication system.

10. The communication apparatus as claimed in claim 8, wherein at least one of the first paging parameters and the second paging parameters is the integer coefficients k for defining the discontinuous reception (DRX) cycle lengths in the GSM or UMTS system, or the parameter SLOT_CYCLE_INDEX of the CDMA 2000 communication system.

11. A method for handling collided paging occasions of a communication apparatus comprising a first subscriber identity card and a second subscriber identity card, the method comprising:
camping on a first cell via a radio transceiver module with the first subscriber identity card;
obtaining information regarding a plurality of first paging occasions distributed within a predetermined time interval for the first subscriber identity card, wherein a plurality of first paging messages are planned to be broadcasted on the first cell in the first paging occasions;
camping on a second cell via the radio transceiver module with the second subscriber identity card;
obtaining information regarding a plurality of second paging occasions distributed within the predetermined time interval for the second subscriber identity card, wherein a plurality of second paging messages are planned to be broadcasted on the second cell in the second paging occasions;
detecting a forthcoming time slot of the predetermined time interval in which one of the first paging occasions collides with one of the second paging occasions;
determining listening to one of the first cell and the second cell in the detected time slot according to at least one of a plurality of decision rules; and
notifying of the determination to the radio transceiver module so as to direct the radio transceiver module to listen to the determined cell to receive a corresponding paging message from the determined cell in the detected time slot,
wherein the decision rules comprises: determining a least recently listened cell among the first and second cells, determining a cell having a longer waiting time period to be listened to among the first and second cells, determining a cell having a better signal quality among the first and second cells, determining a cell having a predicted paging acquisition percentage lower than a guaranteed probability among the first and second cells, and randomly determining a cell among the first and second cells.

12. The method as claimed in claim 11, wherein another time slot prior to the detected time slot has been assigned to listen to one of the first and second cells, no time slot with a collision between one of the first paging occasions and one of the second paging occasions is present between the assigned time slot and the detected time slot, the determination step further comprises determining listening to the other one of the first and second cells in the detected time slot.

13. The method as claimed in claim 11, wherein the determination step further comprises:
obtaining a first previous time slot in which the first subscriber identity card was most recently scheduled to receive the first paging message from the first cell;
obtaining a second previous time slot in which the second subscriber identity card was most recently scheduled to receive the second paging message from the second cell;
obtaining a first waiting time period between the first previous time slot and the forthcoming time slot;
obtaining a second waiting time period between the second previous time slot and the forthcoming time slot; and
determining listening to the cell with the longer waiting time period in the detected time slot.

14. The method as claimed in claim 11, wherein the determination step further comprises:
obtaining a first radio measurement result of the first cell;
obtaining a second radio measurement result of the second cell; and
determining to listen to the cell with the better radio measurement result in the detected time slot.

15. The method as claimed in claim 14, wherein the first radio measurement result and the second radio measurement result are obtained by respectively measuring signal quality received from the first cell and the second cell, or by respectively calculating a total number of successfully decoded first paging messages and second paging messages.

16. The method as claimed in claim 11, wherein the determination step further comprises:
determining that the first subscriber identity card is roaming; and
determining listening to the cell that the first subscriber identity card camps on.

17. The method as claimed in claim 11, wherein the determination step further comprises:
determining that the first subscriber identity card is not roaming; and
determining listening to the cell that the first subscriber identity card camps on.

18. The method as claimed in claim 11, wherein the determination step further comprises:
obtaining the guaranteed probability for a first wireless network comprising the first cell related to the first subscriber identity card;
virtually assigning the detected time slot to the second subscriber identity card for listening to the second cell in advance;
obtaining the predicted paging acquisition percentage of the first subscriber identity card by dividing a total number of first paging messages that have been received or scheduled to be received from the beginning of the predetermined time interval to the detected time slot by the first subscriber identity card into a total number of the first paging messages that have been broadcasted or scheduled to be broadcasted from the beginning of the predetermined time interval to the detected time slot;
determining listening to the second cell in the detected time slot when the predicted paging acquisition percentage exceeds or equals the guaranteed probability; and
determining listening to the first cell in the detected time slot when the predicted paging acquisition percentage is lower than the guaranteed probability.

19. The method as claimed in claim 11, wherein the determination step further comprises:

obtaining a first value for a first wireless network comprising the first cell and a second value for a second wireless network comprising the second cell, wherein the first value and the second value are positive integers;
obtaining a sum value of the first number and the second number;
randomly selecting a positive integer value between 1 and the sum value;
determines listening to the first cell in the detected time slot when the randomly selected value is between 1 and the first value; and
determines listening to the second cell in the detected time slot when the randomly selected value exceeds the first value.

* * * * *